Feb. 3, 1953 L. A. LEIFER ET AL 2,627,194
PROFILE TURNING AND BORING LATHE
Filed June 9, 1950 10 Sheets-Sheet 1

FIG.1.

INVENTORS:
Lorenz A. Leifer
Charles H. Johnson
BY
ATTORNEYS.

Feb. 3, 1953  L. A. LEIFER ET AL  2,627,194
PROFILE TURNING AND BORING LATHE
Filed June 9, 1950  10 Sheets-Sheet 2

FIG. 2.

INVENTORS:
Lorenz A. Leifer
Charles H. Johnson
BY
ATTORNEYS.

Feb. 3, 1953     L. A. LEIFER ET AL     2,627,194
PROFILE TURNING AND BORING LATHE

Filed June 9, 1950     10 Sheets-Sheet 4

INVENTORS:
Lorenz A. Leifer
Charles H. Johnson
BY
ATTORNEYS.

Feb. 3, 1953 L. A. LEIFER ET AL 2,627,194
PROFILE TURNING AND BORING LATHE
Filed June 9, 1950 10 Sheets-Sheet 5

INVENTORS:
Lorenz A. Leifer
Charles H. Johnson
BY
ATTORNEYS

INVENTORS:
Lorenz A. Leifer
Charles H. Johnson

FIG. 19.

Patented Feb. 3, 1953

2,627,194

UNITED STATES PATENT OFFICE 2,627,194

PROFILE TURNING AND BORING LATHE

Lorenz A. Leifer and Charles H. Johnson, Madison, Wis., assignors to Gisholt Machine Company, Madison, Wis., a corporation of Wisconsin Application June 9, 1950, Serial No. 167,002

30 Claims. (Cl. 77—3)

1

This invention relates to an automatic profile turning and boring lathe, the principal features of which have been embodied in a lathe providing for automatic repeat cutting operations of predetermined cutting depth and length.

One of the principal objects of the invention is to provide a profile turning and boring mechanism that will automatically repeat in successive cuts of predetermined depth upon a single workpiece until the machining of the workpiece is completed.

Another object of the invention is to provide such successive cutting operations with a single tool and with stop indexes to determine the traverse and feed in accordance with the individual length of each given cut.

Another object is to provide a fully automatic profile turning and boring device adapted to complete a series of successive cutting cycles by a single tool upon a single workpiece, and then to be automatically returned to starting position for repeating the same series of cuts upon a succeeding workpiece.

Another object is to utilize a fluid pressure actuation for the clutches and power cylinders with electrical switching means for automatically controlling the same through solenoid operated valves whereby the control is obtained more accurately and wells may be provided for completion of the machining of shoulders and the like.

Other objects and advantages will be set forth in detail in the accompanying description of an embodiment of the invention as incorporated in a profile boring lathe and illustrated in the accompanying drawings.

2

The lathe illustrated is of a type having a bed 1, a headstock 2 and a movable platen or table 3 disposed on the bed to move toward and away from the headstock into and out of operative position.

The bed 1 is generally short and has longitudinal ways 4 upon which table 3 moves. Power cylinders 5 and 5' are mounted along the corresponding sides of bed 1, having pistons 6 and 6', respectively, with forwardly extending piston rods 7 and 7', respectively, for moving the table. For this purpose the rear piston rod 7' has its forward end secured to a bracket 8 depending from the forward end of table 3.

The forward end of the front piston rod 7 passes through a housing 9 bolted to the bottom of table 3 near the forward end of the latter, and has a pull head 10 at the end of the rod for engaging the housing 9 to assist in moving the table rearwardly.

Housing 9 contains the table lock mechanism which comprises a bell crank lever 11 pivoted to the housing 9, and which operates a lock pin 12 extending horizontally toward the bed 1. The inner end of lock pin 12 carries a roller 13 adapted to ride along a track 14 secured to the front side of bed 1. The short arm of the bell crank lever 11 engages in a notch 15 in the front piston rod 7 whereby forward movement of the rod urges inward movement of the locking pin 12 and its roller 13 against track 14.

When table 3 reaches its forward position, roller 13 drops into a notch 16 in track 14 thereby locking housing 9 and table 3 against further forward movement. At the instance of completion of this locking action a stop collar 17 secured on rod 7 engages the housing 9.

Stop collar 17 has an arm 18 thereon which engages the button of a limit switch 19, as will be described more fully hereinafter.

The return movement of table 3 is effected by movement of the pistons 6 and 6' rearwardly in the corresponding cylinders 5 and 5'. The front piston rod 7 in its initial rearward movement actuates bell crank lever 11 to withdraw roller 13 of locking pin 12 from recess 16 in track 14, thereby releasing table 3 for rearward movement. Thereupon pull head 10 engages housing 9 and assists in pulling table 3 rearwardly.

The headstock 2 of the lathe has a spindle drive motor 20 mounted thereon and connected by means of multiple V-belts 21 to a main drive shaft 22 in the headstock. The drive shaft 22 is connected to drive the lathe spindle 23 in the headstock 2 by means of suitable transmission mechanism not shown.

A feed shaft 24 extends through the headstock 2 parallel to the spindle 23 and rearwardly to the opposite end of the bed, for driving the tool slides as described hereinafter.

Figure 1:
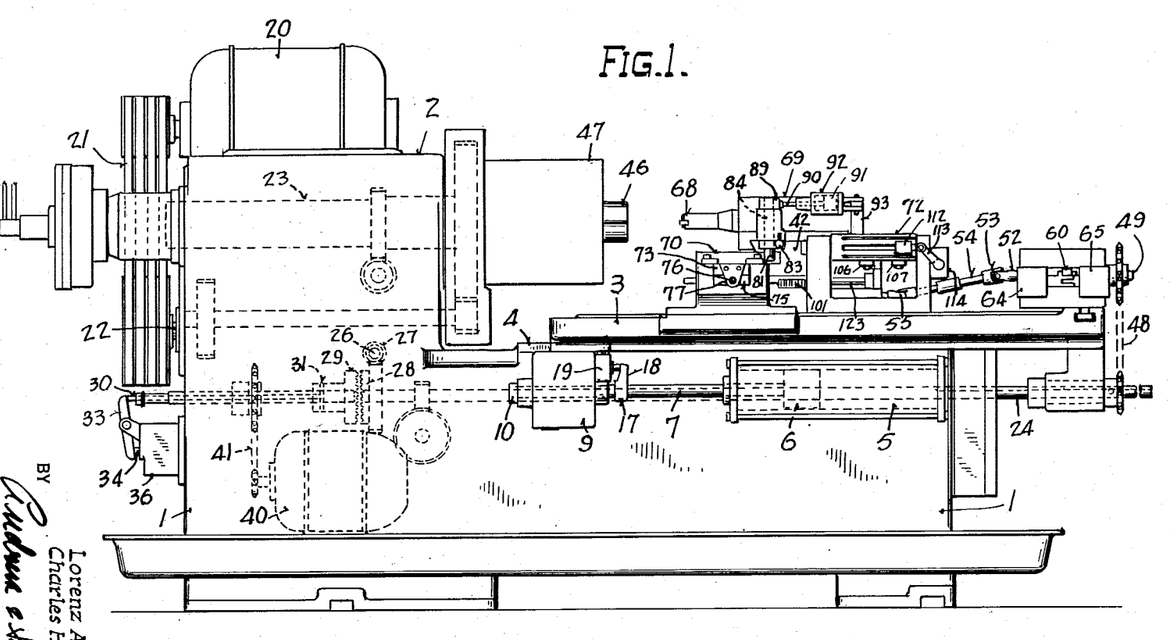
Figure 1 is a front side elevation of the lathe.
Figure 2:
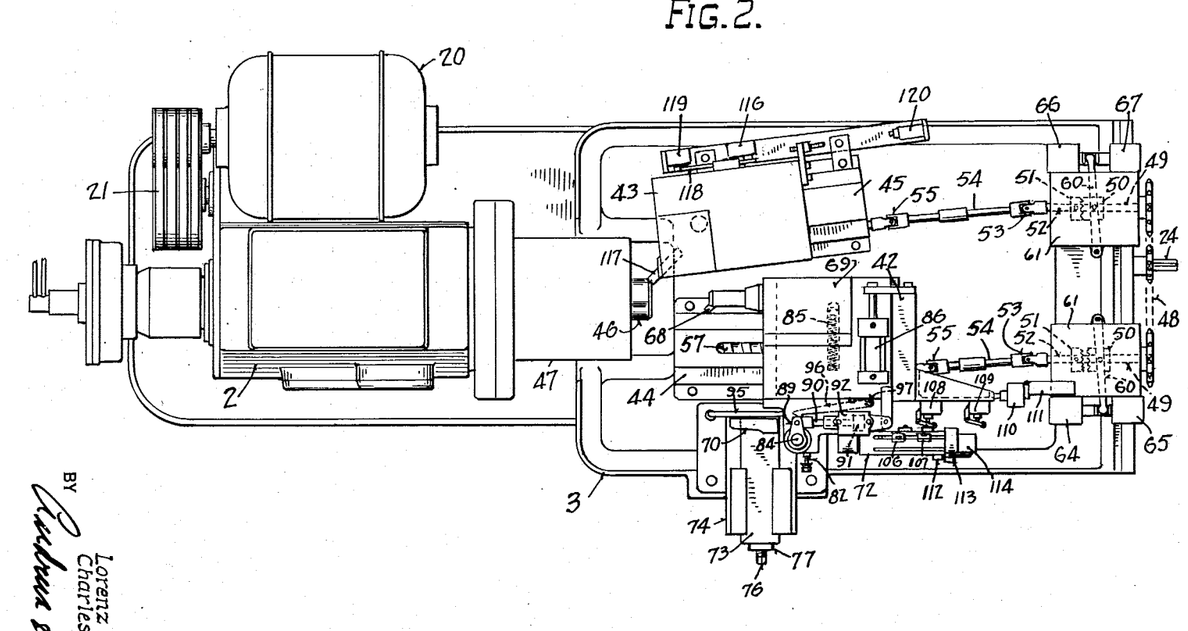
Fig. 2 is a top plan view of the lathe of Fig. 1.
Figures 3, 4, 5:
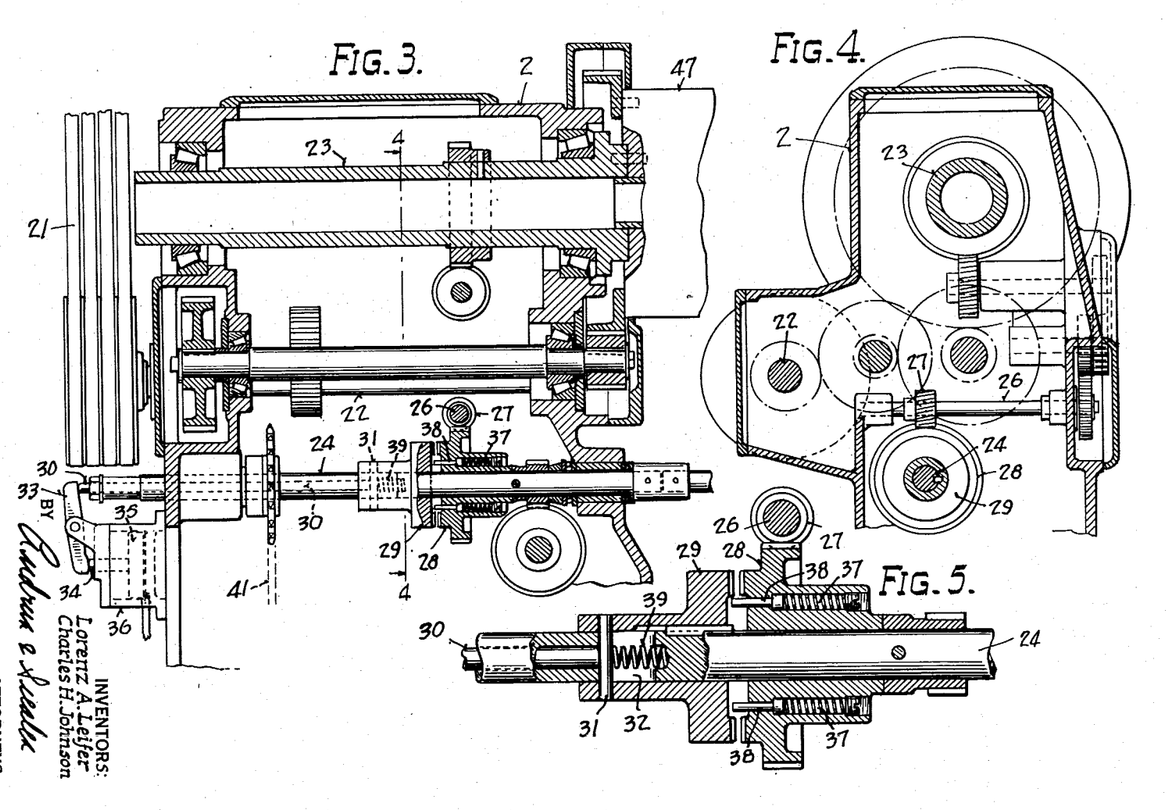
Fig. 3 is a longitudinal section taken axially of the spindle and feed shaft in the headstock.
Fig. 4 is a transverse vertical section taken on line 4—4 of Fig. 3 of the headstock.
Fig. 5 is an enlarged detail section showing the initial feed clutch mechanism for driving the feed shaft from the spindle.
Figure 6:
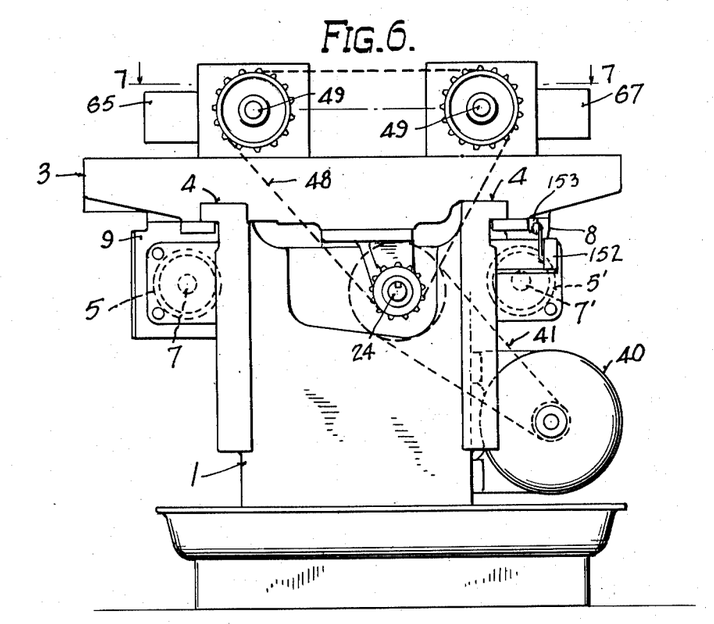
Fig. 6 is a rear end view of Fig. 2 showing the feed chain.

The feed shaft 24 is driven in forward feed in correlation to the spindle speed by means of gearing 25 extending directly from the spindle 23 to a cross shaft 26 carrying a worm 27 driving a rotary clutch member 28 rotationally mounted upon shaft 24. A second clutch member 29 is carried by shaft 24 and rotationally secured thereto. The clutch member 29 is axially movable into and out of engagement with clutch member 28 to thereby selectively drive the feed shaft 24 from the spindle 23. For this purpose a clutch actuating rod 30 extends axially into the end of shaft 24 to the location of the movable clutch member 29, and a transverse pin 31 extends through the rod 30 and the hub of member 29 to actuate the latter in response to longitudinal movement of the rod, as shown in Figs. 3 and 5. A longitudinally extending slot 32 is disposed in shaft 24 on opposite sides of rod 30 to receive pin 31 and provide for its movement axially of shaft 24.

The clutch actuating rod 30 is pushed inwardly to effect engagement of clutch member 29 with clutch member 28, by means of a lever 33 pivotally mounted on the wall of headstock 2 and having one end engaging the outer end of rod 30. The opposite end of lever 33 is engaged by the outer end of a piston rod 34 of piston 35 operating in air cylinder 36.

The clutch members 28 and 29 are normally biased apart by suitable springs 37 and push rods 38 actuated thereby in the body of clutch member 28 (see Fig. 5). If desired, an additional spring 39 may be employed at the inner end of rod 30 to bias the same outwardly.

The shaft 24 is driven at traverse speeds for both forward and back traverse of the slides, by a traverse motor 40 mounted at the rear of headstock 2, and the shaft of which is connected to shaft 24 by drive chain 41 and suitable sprockets.

The table 3 carries at least one tool slide, the table shown having a front tool slide 42 and a rear tool slide 43. The slides 42 and 43 are mounted upon corresponding ways 44 and 45 which are preferably adjustably bolted to table 3 in selected angular position relative to the axis of spindle 23. In the construction shown, front slide 42 has its way 44 secured to obtain a slide movement parallel to the axis of spindle 23 for boring operations. Rear slide 43 has its ways 45 secured at an angle to the axis of spindle 23 for corner chamfering of the workpiece 46.

The workpiece 46 in the present instance is illustrated as a cylindrical forged blank for the construction of an oil well tool joint. The blank 46 is secured in a chuck 47 carried by spindle 23. The chuck 47 is actuated by a suitable air cylinder, not shown, through the hollow spindle 23, as is customary with lathes.

The tool slides, 42 and 43 are traversed in both directions and fed forwardly by means of feed shaft 24. For this purpose a chain 48 connects shaft 24 at its rear end with a corresponding shaft 49 for each slide, by means of suitable sprockets on the respective shafts.

Figure 7:
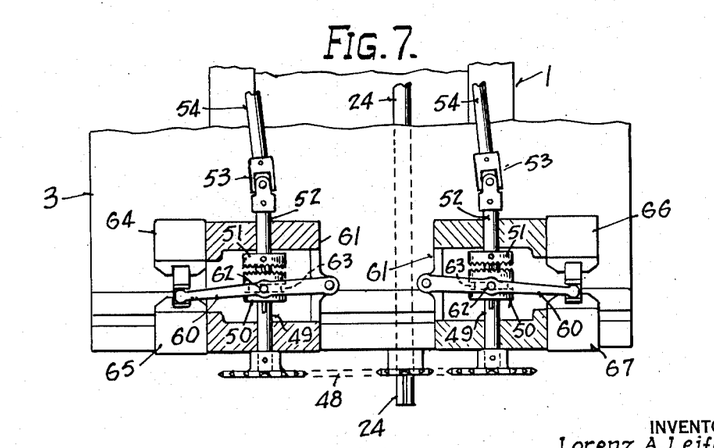
Fig. 7 is a transverse horizontal section taken on line 7—7 of Fig. 6 and showing the drive clutches.
Figure 8:
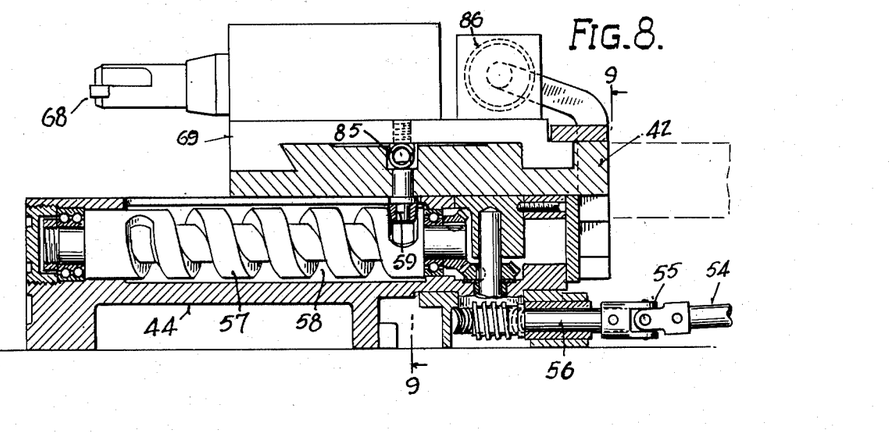
Fig. 8 is a vertical section taken axially of the front slide showing the drive therefor.
Figures 9, 10, 11:
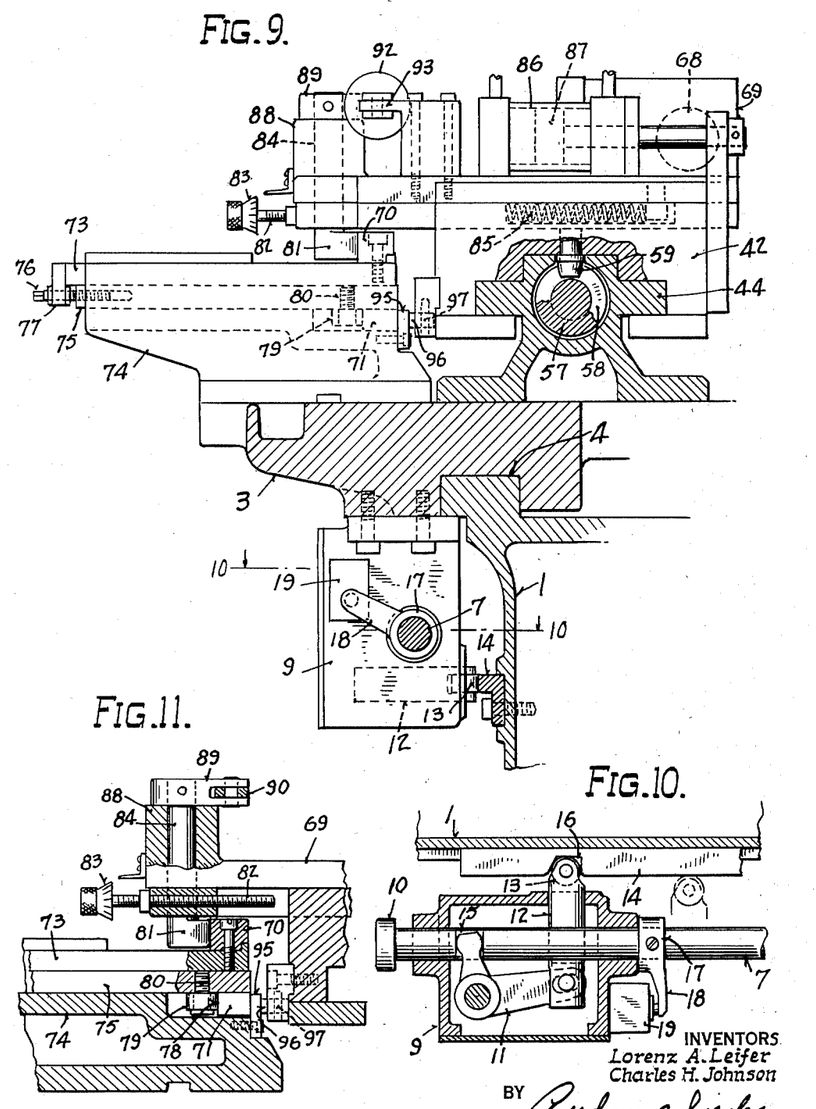
Fig. 9 is an enlarged section taken on line 9—9 of Fig. 8 and showing the front slide construction.
Fig. 10 is a detail horizontal section taken on line 10—10 of Fig. 9 and showing the platen lock.
Fig. 11 is a detail vertical section showing the adjustable stop for determining the bore size.
Figure 12:
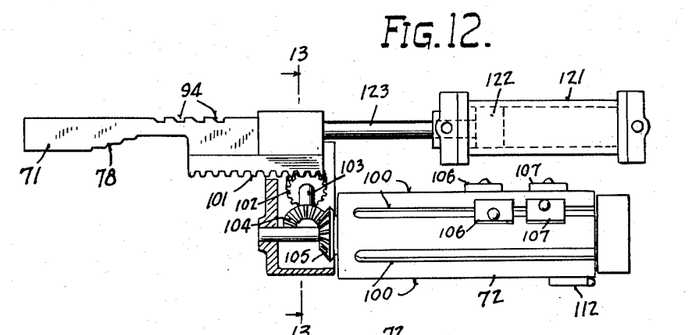
Fig. 12 is a detail view showing the step cam and index drum actuating member.
Figures 13, 14:
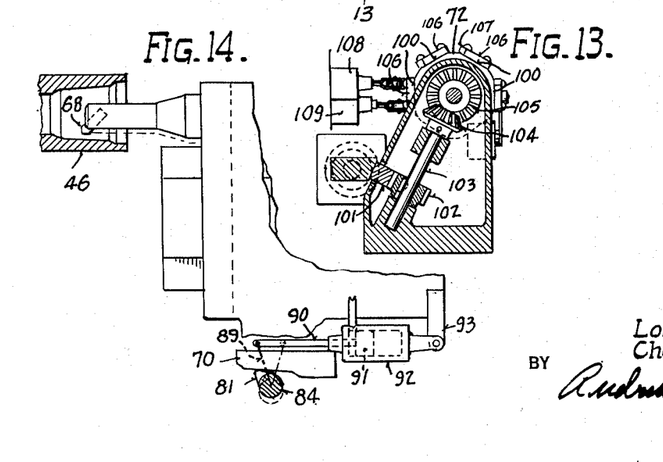
Fig. 13 is a detail transverse section taken on line 13—13 of Fig. 12 showing the gearing for indexing the drum.
Fig. 14 is a detail plan view showing the contour cam follower and its actuation.
Figure 15:
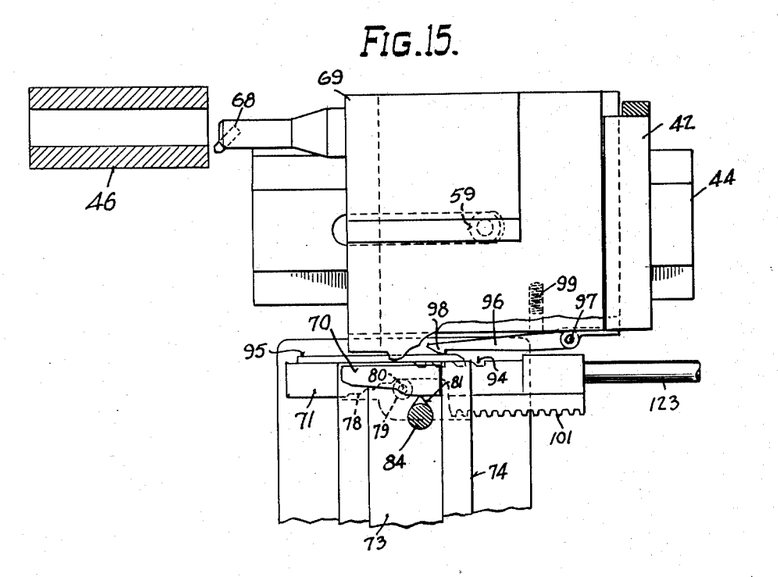
Fig. 15 is a schematic plan view of the slide and cam structures in position for initiating the first cutting operation.
Figure 16:
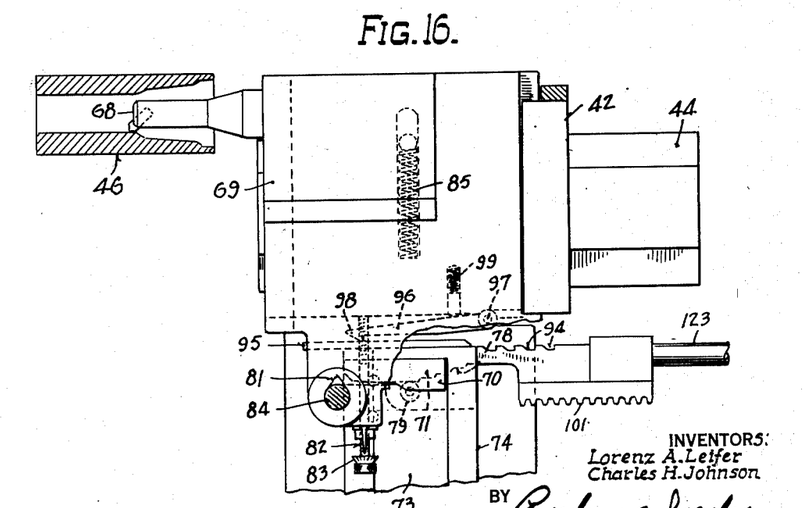
Fig. 16 is a view similar to Fig. 15 showing the parts approaching the end of the last cut wherein the internal bore of the workpiece is being cut.
Figure 17:
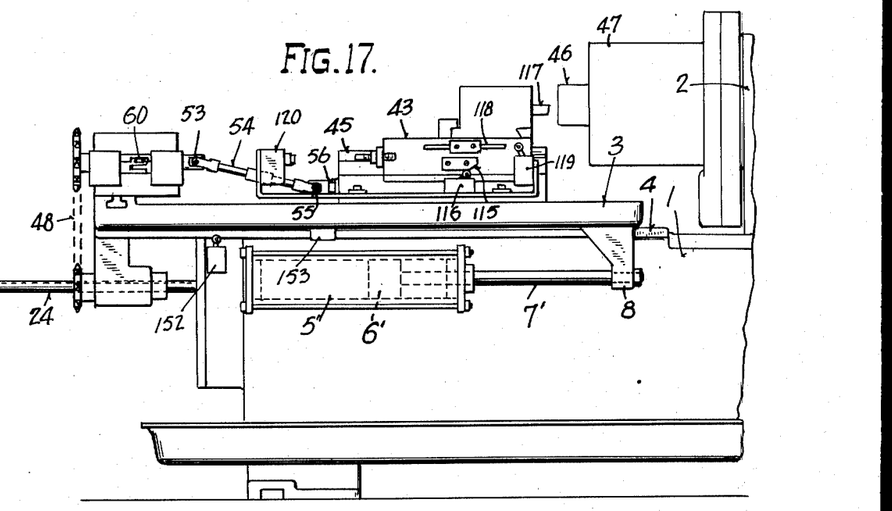
Fig. 17 is a rear side elevation showing the rear slide.
Figure 18:
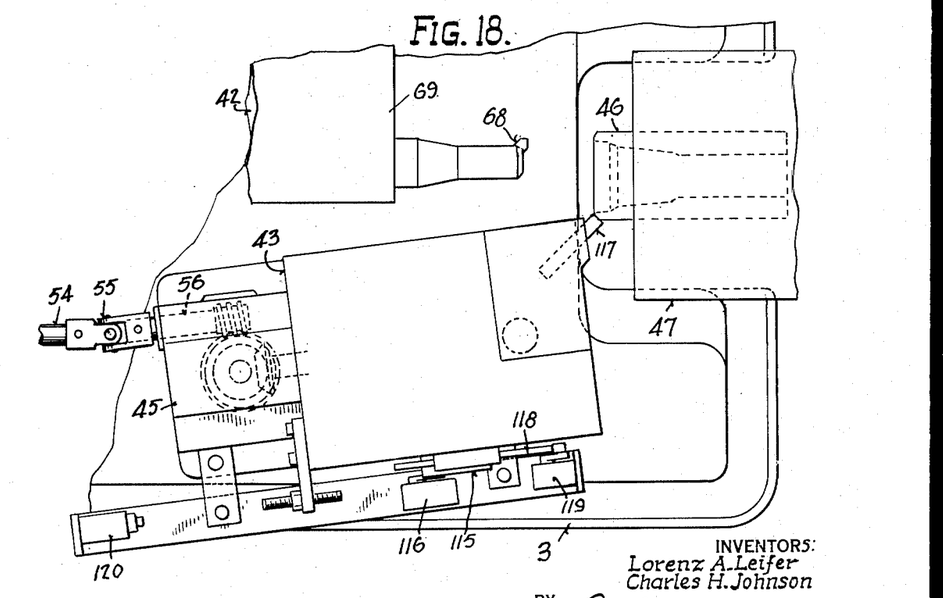
Fig. 18 is a schematic plan view showing the rear slide with its tool in cutting position.

Each shaft 49 is mounted on table 3 and carries an axially movable clutch member 50 rotatably secured thereon and which is adapted to be moved axially into and out of engagement with a corresponding clutch member 51 on a stub shaft 52 carried by table 3 (see Fig. 7). Stub shaft 52 is connected by a universal joint 53 to a coupling shaft 54 which in turn is connected at its opposite end by a universal joint 55 to a shaft 56 in the base for the corresponding ways 44 or 45.

Shaft 56 for each slide is geared to drive a cam drum 57 disposed centrally of the corresponding ways 44 or 45 and parallel to the direction of travel of the corresponding slide 42 or 43. Each drum 57 has a spiral cam groove 58 in its outer surface into which a cam follower 59 depends from the corresponding tool slide so that as the drum is rotated the cam follower 59 is moved axially along the drum to move the slide accordingly.

The movable clutch members 50 are separately actuated by a lever 60 pivoted at one end to clutch housing 61 and having a shift pin 62 riding in a circumferential groove 63 in the hub of each corresponding clutch member. The outer end of lever 60 for the front slide is moved by a pair of opposed electro-magnetic solenoids 64 and 65 mounted on clutch housing 61 on table 3 and having their plungers hinged together at the center and flanged to provide a recess for receiving the end of the lever and actuating the same in accordance with movement of the plungers. Opposed solenoids 66 and 67 are similarly provided on the corresponding clutch housing on table 3 for actuating the lever 60 for the rear slide clutch.

In the construction illustrated, as the solenoids 64 and 66 pull their respective clutch levers 60 toward the same, clutch members 50 are moved into engagement with the corresponding clutch members 51, and as the solenoids 65 and 67 pull their respective clutch levers 60 toward the same, clutch members 50 are disengaged from the corresponding clutch members 51. By employing a clutch 50—51 for each of the tool slides 42 and 43 the slides may be actuated selectively or simultaneously, as may be desired.

In the machining of the workpiece 46, illustrated, it is desirable to first effect the internal boring operations by the front slide 42 and then to effect the corner chamfering by the rear slide 43. In carrying out the machining operations described, it becomes necessary to employ repeat cuts for the internal boring operations since the depth of cut necessary to provide the taper bore profile desired is too great for a single cut operation.

The lathe of the present invention is adapted to effect the desired taper boring operations in successive cuts of predetermined individual depths, then to bore the inner section of the blank, and then to corner chamfer the end of the blank, all automatically in a single cycle of operation of the lathe.

In general, the above is accomplished by mounting the boring tool 68 upon a cross slide 69 on front slide 42 and changing the position of the cross slide 69 to effect the desired adjustment for the depth of cut for each successive cutting operation. This latter is accomplished by employing a contour cam 70 for controlling the movement of the cross slide 69 during feeding of slide 42 to effect the desired contour cut, and then changing the position of cam 70 between each successive cut to effect the desired re-setting of the tool 68 to provide the desired depth of cut therefor.

The position of contour cam 70 is adjusted by means of a step cam 71 which is indexed with the cut as described hereinafter. Since the length of the several cuts will vary, the length of feed for slide 42 is determined by a control and stop drum 72 which is indexed simultaneously with the step cam 71.

The mounting and operation of the contour cam, step cam and control drum may vary in different lathes and to suit different machining operations. The several cams may be constructed to provide different contours of cut and for different numbers of successive cuts.

In the lathe illustrated, the contour cam 70 is shaped to simulate the internal taper bore contour desired in the exposed end of workpiece 46. The cam 70 is mounted on slide plate 73 carried in a housing 74 on table 3. Plate 73 is supported upon a second similar plate 75 in housing 74, and both plates 73 and 75 are disposed for adjustment in a direction normal to the direction of feed of slide 42 and generally parallel to the direction of movement for cross-slide 69.

Plate 73 may be adjusted in its position relative to plate 75 by means of a micrometer screw 76 carried by a bracket 77 on the outer end of plate 73 and threaded into the outer end of plate 75 to provide a fine adjustment for the final cut of tool 68.

The position of plate 75, and with it that of plate 73 and contour cam 70, is adjusted by step cam 71 which is disposed beneath and to the rear of the plates and is engaged on its front step cam surface 78 by a roller 79 on a stud 80 depending from lower plate 75.

The step cam 71 is disposed in a transverse groove in housing 74 on table 3 and is disposed to be indexed a predetermined longitudinal movement for each successive cutting operation. In each indexing movement of step cam 71 an additional step is presented to move roller 79 and with it plates 73 and 75, contour cam 70 and cross-slide 69 in the direction of the necessary depth adjustment for cutting tool 68.

The position of cross-slide 69 is governed by contour cam 70 by means of a cam follower 81 carried by the cross-slide and adapted to engage the front cam surface of the contour cam and to ride along the same as slide 42 feeds forward. The length of the cam surface of contour cam 70 should be at least as great as the total length of the contour cut so that the follower 81 controls the cut throughout the feeding movement therefor.

In the final cut for the workpiece 46 illustrated, it is desirable to have tool 68 continue and bore the central cylindrical portion of the blank after completing the contour cut. For this purpose the inward movement of cross-slide 69 is stopped at a predetermined position to effect the desired diameter for the internal bore, by employing a threaded stop 82 carried by the front of the cross-slide and extending inwardly therefrom to engage the front of a portion of the slide 42. The stop 82 is adjustable by means of a micrometer screw indicator 83 at its forward end.

Upon the back traverse of slide 42 in each instance it is desirable to remove boring tool 68 from the work, and this is accomplished by mounting cam follower 81 to extend inwardly on a rotatable vertical shaft 84 whereby rotation of the shaft approximately 60° will effect a release of the follower from contour cam 70 and permit cross-slide 69 to move in a direction spacing the tool 68 from the work.

The cross-slide 69 is biased inwardly at all times to provide a substantially constant pressure of follower 81 against cam 70, by suitable means such as a hydraulic cylinder or the compression spring 85 disposed in a channel in slide 42 and bearing against an abutment of slide 69. If need be, the force of the compression spring 85 may be supplemented during machining operations by an air cylinder 86 and piston 87 mounted between cross-slide 69 and slide 42.

The shaft 84 is journaled in a bearing support 88 at the front end of cross-slide 69 and the upper end of the shaft carries a crank 89 which is operatively pivotally connected to the outer end of a piston rod 90 having its piston 91 operating in an air cylinder 92 having its opposite end pivotally supported by a bracket 93 on cross-slide 69.

The step cam 71 is indexed automatically for successive cuts of the boring tool 68 by the back traverse movement of slide 42. For this purpose a shank extension of step cam 71 has a number of ratchet notches 94 in the rear side thereof corresponding to one less than the maximum number of cuts to be taken.

The notches 94 are arranged in series relation and are disposed in relative spaced relation corresponding to the spacing of the cam steps in cam surface 78. In the initial positioning of cam strip 71 at the start of the cycle and with roller 79 engaging the first control region of cam surface 78, all but the first notch 94 are disposed in the groove confining cam strip 71. The back of the groove referred to consists of an upright plate 95 against which the cam strip 71 abuts and which hides the unexposed notches 94.

A pawl 96 is pivoted to the front of slide 42 on a vertical pin 97 and extends toward headstock 2 to have its head 98 move along a path adjacent the ratchet notches 94 during movement of slide 42. The pawl 96 is biased toward ratchet notches 94 by spring 99 disposed between the pawl and slide 42.

During initial forward movement of slide 42 the pawl 96 cams over the first open notch 94 of the ratchet and over plate 95 covering the remaining ratchet notches 94. Thereafter, during back traverse of slide 42 the pawl 96 rides along plate 95 and then passes into the exposed notch 94 and draws cam strip 71 along with it to the end of the back traverse for slide 42, which is a distance sufficient to just expose the next succeeding notch 94 from behind plate 95 and present the first step of cam surface 78 beneath roller 79. Upon the next succeeding forward movement of slide 42 pawl 96 cams out of its notch 94 and over plate 95 and is ready for the next indexing movement upon back traverse of the slide 42.

The successive operations of slide 42 are controlled by the drum 72 having a plurality of similar control faces 100 thereon corresponding in number to the maximum number of cuts employed for tool 68. Drum 72 is adapted to be indexed to present a corresponding control face 100 for each successive cut.

For this purpose the shank extension of step cam strip 71 has a gear rack 101 diagonally disposed on the upper front corner thereof. A gear 102 meshes with rack 101 and is secured to rotate a diagonally disposed shaft 103 having a beveled gear 104 at its upper end meshing with a bevel gear 105 on the end of drum 72. The gear ratios are such that each indexing movement of cam 71 will effect a corresponding indexing movement of drum 72 to present the next successive face 100 in operative position.

Each face 100 has two or more control dogs 106 and 107 thereon. Dog 106 is disposed to be engaged by the operating lever of a switch 108 when slide 42 reaches the position in its forward traverse where feeding should commence, whereupon switch 108 effects the desired controls as described hereinafter. Dog 107 is disposed to be engaged by the operating lever of a switch 109 when slide 42 reaches the position in its forward feed where it is desired to stop the feed and back traverse. The back traverse continues until the rear end of slide 42 engages and trips a switch 110 mounted on a bracket 111 on the corresponding clutch housing 61 on table 3 and thereupon switch 110 stops the back traverse.

The drum 72 carries a dog 112 which is positioned to engage the operating arm 113 of a switch 114 when the drum is indexed for the last cutting operation and thereby shift the next operation to the rear slide 43 upon actuation of switch 110 by the final back traverse of slide 42.

The rear slide 43 then traverses forward until a cam 115 thereon actuates a switch 116 on the base of way 45, and shifts the slide from traverse to feed. During feeding of rear slide 43 the corner chamfering of the end of workpiece 46 is accomplished by tool 117 carried by the slide.

At the end of the feed stroke for slide 43 a stop rod 118 on the side of the slide actuates a switch 119 on the base of way 45, which then initiates the back movement of table 3 withdrawing all tools from the proximity of the work and restoring switch 19 to normal.

Restoration of switch 19 to normal effects back traverse of rear slide 43 until a bracket stop on the rear end of the latter engages and trips switch 120 on the base of way 45, whereupon back traverse is stopped and all parts are restored to initial position for starting a new work cycle.

The restoration of the parts to normal includes a recocking of the step cam 71 and control drum 72 to starting position. This is accomplished by an oil cylinder 121 on table 3 having a piston 122 with its piston rod 123 connected to the shank extension of step cam 71 whereby upon application of pressure oil to the piston 122, through valve 124 from a small pump 125 on headstock 2, the piston pushes step cam 71 toward the headstock 2 to starting position. At the same time gear rack 101 on cam strip 71 returns drum 72 to start position for another work cycle.

Figure 19:
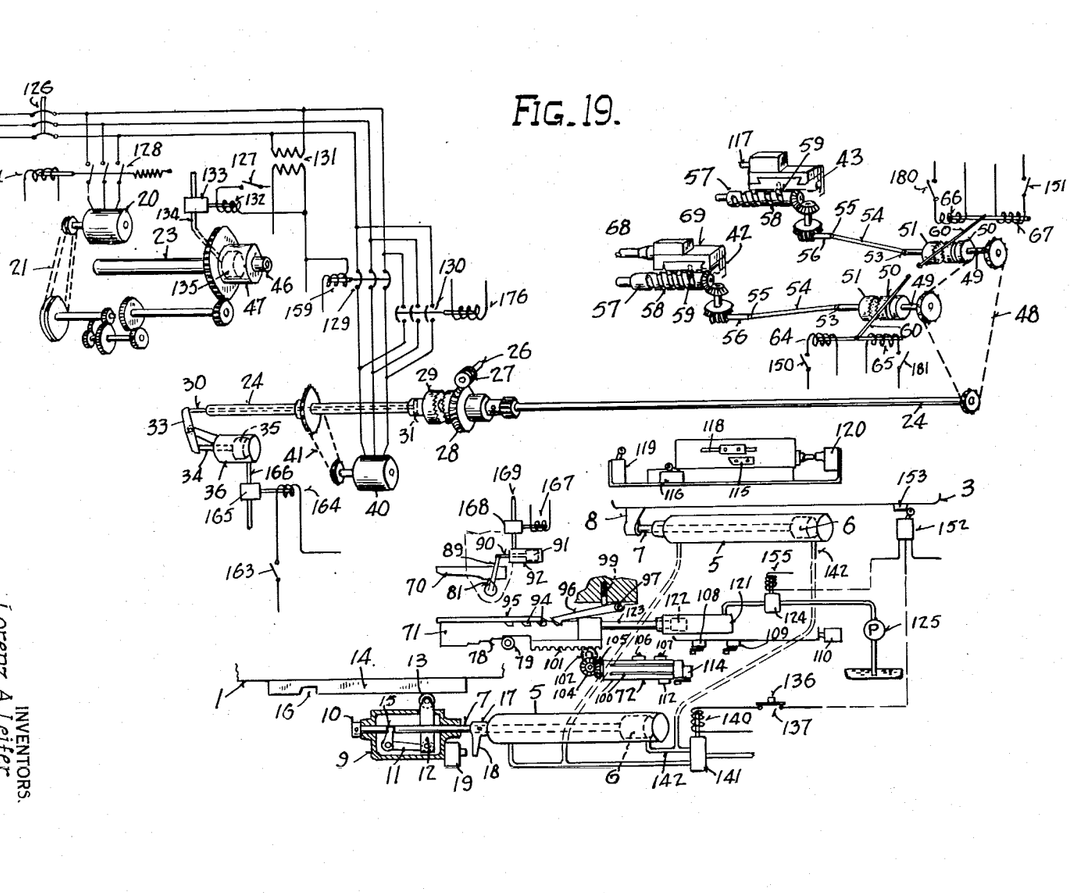
Fig. 19 is a schematic diagram of the several moving parts showing the actuating cylinders and valves and the location of the switches employed in controlling the several movements.
Figure 20:
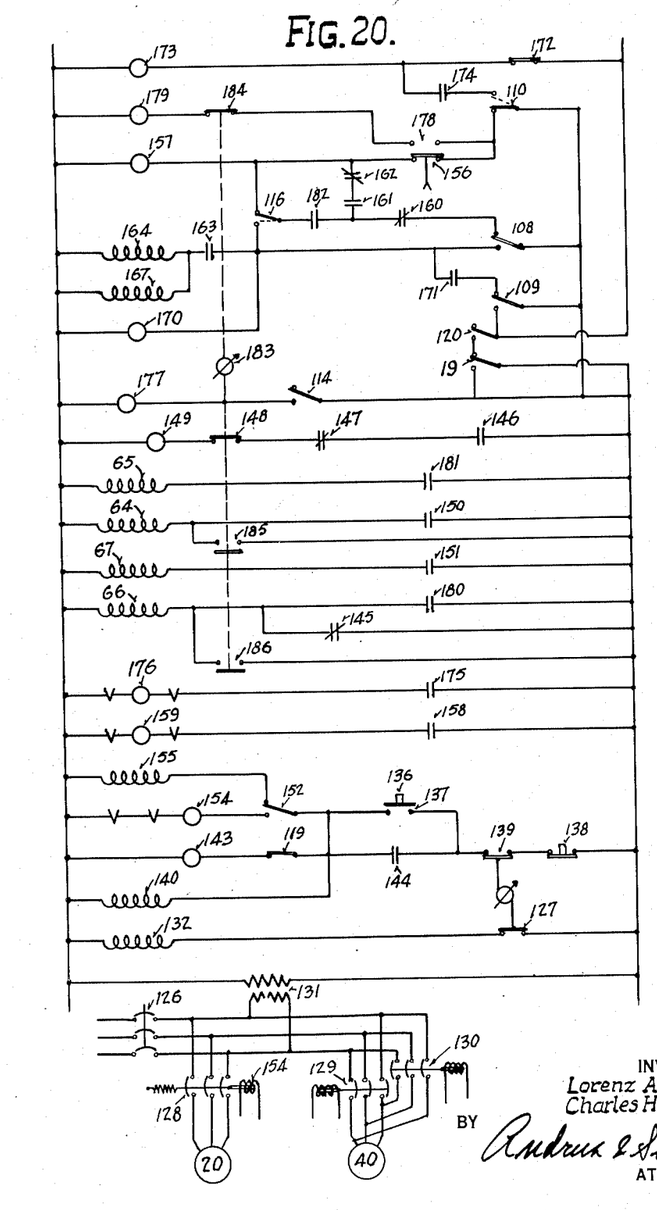
Fig. 20 is a schematic wiring diagram for the control of the machine.

The above description of the operating cycle can be more readily understood by reference to the diagrams of Figs. 19 and 20.

Referring to the wiring diagram in Fig. 20, the several switches are shown in their normal position after closing of the main line circuit breaker switch 126 and turning of the chuck-unchuck switch 127 to position for chucking of a workpiece 46 at the start of a cycle. The main line supplies current to the spindle motor 20 through a normally open switch 128 and to traverse motor 40 through normally open forward and reverse switches 129 and 130 respectively, and to the control switches, relays and solenoids through a transformer 131.

The switch 127 referred to opens a circuit from the secondary of transformer 131 through a solenoid 132, serving to shift a two-way valve 133 in the air pressure branch line 134 leading to the double acting chuck actuating cylinder 135, shown schematically in Fig. 19, to effect closing of the chuck 47 upon the workpiece 46.

The cycle is then started by the operator pressing the start button 136 which closes the normally open starting switch 137 and thereby completes a circuit from the secondary of transformer 131 through the normally closed stop switch 138, the closed unchuck safety cut-out switch 139, switch 137, and the platen solenoid 140 which operates valve 141 in air branch line 142 leading to the rear ends of the platen cylinders 5 and 5', resulting in a forward feed of the platen or table 3. At the same time the circuit is closed by start switch 137 through normally closed switch 119 and a time delay relay 143 which closes the holding contacts 144 by-passing starting switch 137 so that the start button 136 may be released by the operator.

Relay 143, when energized, also opens an interlock switch 145 to prevent energization of the rear slide clutch engage solenoid 66. Energizing of relay 143 also closes a switch contact 146 which completes a circuit from the secondary of transformer 131 through a normally closed contactor 147, slide sequence selector switch 148 and the front slide relay coil 149.

Relay 149 closes a switch 150 to complete a circuit from the secondary of transformer 131 through the clutch engage solenoid 64 for the front slide 42 and also closes a switch 151 to complete a circuit from the secondary of transformer 131 through the clutch disengage solenoid 67 for the rear slide 43. Thereupon clutch 50—51 for the front slide is closed and clutch 50—51 for the rear slide is held open.

As table 3 moves forwardly a limit switch 152 disposed on the rear side of bed 1 is shifted by a cam 153 on the underside of the table to complete a circuit from the secondary of transformer 131 through stop switch 138, interlock 139 and either start switch 137 or holding switch 144, and through the solenoid 154 employed to close the spindle switch contacts 128 to energize spindle motor 20, thereby starting the spindle 23 to rotate. Solenoid 154 stays energized throughout the remainder of the cycle.

Prior to this shifting of switch 152 and at the time start button 136 was originally actuated, a circuit was completed through the start switch 137 and a solenoid 155 which opens valve 124 and actuates cylinder 121 to recock the step cam 71 and drum 72 to start position.

As table 3 reaches the end of its forward movement where lock roller 13 on pin 12 enters lock notch 16 in track 14, the arm 18 on stop collar 17 engages switch 19 and shifts the same to complete a circuit from the secondary of transformer 131 through switch 19, the normally closed switch 110, a normally closed switch 156 and the forward traverse relay 157, which latter then closes switch 158 and thereby completes a circuit from the secondary of transformer 131 through the forward traverse solenoid 159 which is then energized to close the forward traverse switch contacts 129 and energize traverse motor 40 in a forward direction.

When slide 42 starts to traverse forwardly, it moves away from limit switch 110 thereby permitting this switch to shift to back traverse position ready for closing of the back traverse circuit as described hereinafter. Energization of forward traverse relay 157 continues by a holding circuit through switch 19, switch 108, normally closed contacts 160, holding contactor 161 closed by relay 157, and the normally closed contacts 162.

Traverse motor 40 thereupon drives feed shaft 24 by chain 41, and feed shaft 24 drives the front slide 42 in forward traverse until a dog 106 on the corresponding first face of drum 72 trips switch 108.

When switch 108 is shifted by dog 106 it opens the circuit for forward traverse relay 157, thereby terminating energization of the traverse motor 40 by de-energizing solenoid 129 and opening switch 159, and it completes a circuit from the secondary of transformer 131 through switch 19, switch 108, the contacts 163, held closed by relay 143, and the feed solenoid 164 which closes valve 165 in branch air line 166 leading to cylinder 36, the piston 35 of which actuates feed clutch 28—29 to close the same and effect forward feed of front slide 42. At the same time a similar circuit is completed through tool relief solenoid 167 to energize the same and open a valve 168 in a branch air line 169 leading to the front end of cylinder 92 to turn shaft 84 and cam follower 81 so that the latter properly engages the contour cam 70 throughout the feeding operation.

Shifting of switch 108 as described also completes a circuit from the secondary of transformer 131 through switch 19, switch 108 and time delay relay 170 which in turn closes a holding switch 171 in a circuit for the feed solenoid 164 through switch 109 so that when dog 106 passes the actuating arm of switch 108 and allows the latter to shift back to normal, the feed of slide 42 will continue. At the same time relay 170 opens the normally closed contacts 160 which prevents any possible energization of the forward traverse relay 157 upon the return of switch 108 to normal.

Slide 42 feeds forward until a dog 107 on the face of drum 72 engages the actuating arm of switch 109 which then opens the circuit of feed solenoid 164, stopping the feed, and also opens the circuit of time delay relay 170, thereby opening switch 171 and closing contacts 160. The time delay relay 170 is set to delay the closing of normally closed switch contacts 172 in a back traverse circuit sufficiently long to allow the tool 68 to clean up the cut circumferentially of the workpiece, and thereupon the back traverse control circuit is completed from the secondary of transformer 131 through switch 19, switch 109, switch 172 and back traverse relay 173.

Energization of relay 173 completes a holding circuit for itself through switch 19, switch 110 and normally open holding contacts 174. Relay 173 also closes switch contacts 175, thereby completing a circuit from the secondary of transformer 131 through contacts 180 and the back traverse solenoid 176 which closes the back traverse switches 130 leading to motor 40 to energize the latter in reverse, thereby effecting the back traverse of front slide 42.

During the back traverse of slide 42 switch 109 returns to normal starting position. Likewise pawl 96 will engage the first notch 94 to retract step cam 71 one step to the right so that the step cam 71 is indexed to adjust the depth of the next succeeding cut of tool 68, and drum 72 is indexed to present the next successive set of dogs for controlling the traverse and feed of slide 42.

Also during the back traverse the cam follower 81 turns on cam 70 to relieve the tool 68 from the work 46. For this purpose solenoid 167 is automatically de-energized along with feed solenoid 164 to reverse the valve 168 leading to cylinder 92 and thereby turn the shaft 84 and cam follower 81.

When slide 42 reaches its retracted position it engages switch 110 and shifts the same to open the holding circuit for back traverse relay 173, and to close the initial forward traverse circuit for forward traverse relay 157 to start a second cutting operation which then proceeds exactly as described above for the first cutting operation. During back traverse from the second cut the pawl 96 will catch in the second notch 94 and thereby index step cam 71 and drum 72 for the third cutting operation. A notch 94 is provided for indexing step cam 71 for each successive cut.

The cutting operations for tool 68 are thus repeated until the final cut is complete. Upon the indexing of drum 72 for the final cut, dog 112 closes the normally open switch 114 and thereby completes a circuit from the secondary of transformer 131 through switch 19, switch 114 and a time delay relay 177. The time lag of this relay 177 is such that it does not function until after the forward traverse of slide 42 releases switch 110 so that the latter shifts to back traverse position and forward traverse of the slide is continued through the holding circuit described previously.

Relay 177 serves to shift switch 156 to open position so that forward traverse of slide 42 will not be initiated when switch 110 is engaged upon the next back traverse of the slide. At the same time relay 177 closes a normally open switch 178 preparatory to the operation of the rear slide 43 upon engagement of switch 110 as the back traverse of slide 42 is completed. For this purpose shifting of switch 110 by the back traverse of slide 42, as before, opens the holding circuit for the back traverse relay 173 thereby stopping slide 42 in its retraced position, and completes a circuit from the secondary by transformer 131 through switch 19, switch 110, switch 178 and the rear slide relay coil 179.

Energization of relay 179 opens the normally closed contacts 147 to thereby de-energize the front slide relay coil 149 and return its switches 150 and 151 to normal open position thereby de-energizing clutch solenoids 64 and 67. The relay 179 also shifts the slide clutches 50—51 by closing switch 180 to complete a circuit from the secondary of transformer 131 through the solenoid 66 for rear slide 43 thereby closing the rear slide clutch 50—51, and by closing switch 181 to complete a circuit from the secondary of transformer 131 through solenoid 65 for the front slide 42 thereby opening the front slide clutch 50—51.

At this stage of the cycle, relay 179 also closes a normally open switch 182 to complete a circuit from the secondary of transformer 131 through switch 19, switch 108, normally closed contacts 160, contacts 182, switch 116 and the forward traverse relay coil 157, thereby effecting forward traverse of the rear slide 43.

Forward traverse of rear slide 43 continues until cam 115 actuates switch 116 to thereby open the forward traverse circuit just described and complete a circuit to the feed solenoid 164 and to time delay relay 170 through switch 108, switch 19, contacts 160 and 182 and the secondary of transformer 131. Energization of relay 170 closes the holding contacts 171 permitting switch 116 to return to normal. Thereupon the rear slide 43 is fed forward during cutting of its tool 117 until the stop rod 118 on slide 43 engages switch 119 and opens the same.

Opening of switch 119 opens the circuit for time delay relay 143 and thereby returns its switch contacts 144, 146 and 163 to normal open position and contacts 145 to normal closed position. Opening of contacts 144 is delayed sufficient to clean up the cut by tool 117 before the spindle solenoid 154 is re-energized and switch 128 is opened to stop the spindle motor 20 and de-energize solenoid 155.

The platen forward solenoid 140 is de-energized by the opening of switch 144 and its valve 141 is reversed to admit fluid into the forward ends of cylinders 5 and 5'. The piston 6 of front cylinder 5 then withdraws lock roller 13 from lock recess 16 in track 14, and pull head 10 engages housing 9 to assist the rear cylinder 5' in withdrawing platen 3 from operative position. As platen 3 moves rearwardly switch 19 is released and returns to normal position.

Closing of contacts 145 completes a circuit from the secondary of transformer 131 through the rear slide clutch engage solenoid 66 to retain the clutch closed for back traverse.

Opening of contacts 146 prevents energization of the front slide contactor relay coil 149 until the next cycle of the lathe. Opening of contacts 163 stops the feed of the rear slide 43 by de-energizing feed solenoid 164.

De-energization of relay 170 by opening of switch 19 upon the platen 3 starting back, returns switch contacts 160, 171 and 172 to normal thereby closing the circuit for back traverse relay 173 through contacts 172, switch 120, which has been closed by the forward movement of the rear slide away from the same, switch 19 and the secondary of transformer 131. Relay 173 closes switch 175 and energizes the back traverse solenoid 176 closing switch 130 to motor 40.

The rear slide thereupon back traverses until it engages switch 120 and opens the circuit just described.

As platen 3 moves farther rearwardly, it releases switch 152 which returns to normal preparatory to recocking of the step cam 71 and drum 72 upon starting of the next cycle.

The cycle is thereupon complete and all controls are restored to normal preparatory to the start of another cycle.

A slide simultaneous and sequence selector knob 183 is shown for operating switch 148 in the circuit of the front slide control relay 149, and a similar switch 184 in the circuit of the rear slide control relay 179. Switches 148 and 184 are retained closed to provide sequence operation of the slides 42 and 43, as described. If it is desired to have the slides operate simultaneously, the control knob 183 is turned to open switches 148 and 184 and to close switches 185 and 186, respectively, for closing the circuits of the corresponding solenoids 64 and 66 for engaging both clutches 50—51 simultaneously and at all times.

It will be understood that a spindle brake circuit, suitable manual inching and additional selector circuits will normally be added as desired.

The invention has been described in connection with a specific type of lathe and with stop boring of a workpiece. It will be understood that it may be employed with other types of lathes and for turning or boring operations of any nature wherein it is desired to take successive cuts over the same surface. The invention provides an automatic setting for the depth of cut of a turning or boring tool for successive cuts.

The invention may have various embodiments within the scope of the accompanying claims.

We claim:

1. A lathe comprising a headstock having a rotary work spindle, a bed disposed to support a tool slide for movement toward and away from the work carried by said spindle, a slide mounted on said bed for movement toward and away from the work, means to drive said spindle, means to move said slide in forward traverse and feed and in back traverse, a cross slide carried by said first slide for movement thereon in a direction generally normal to the movement of said first slide, a cutting tool carried by said cross slide for engaging the work, a normally stationary step cam abutment carried by the bed and fixed in relation to the path of movement of said first slide adapted to be indexed longitudinally for successive cutting operations with the steps thereof of a height to determine the depth of cut for each corresponding cut, means to bias said cross slide against a single step of said step cam to determine the position of cut for said tool, and automatic means to index said step cam to present successive step abutments for said cross slide to set the cutting tool for a predetermined depth of cut for each successive forward feed of said first slide.

2. A lathe comprising a headstock having a rotary work spindle, a bed disposed to support a tool slide for movement toward and away from the work carried by said spindle, a slide mounted on said bed for movement toward and away from the work, means to drive said spindle, means to move said slide in forward traverse and feed and in back traverse, a cross-slide carried by said first slide for movement thereon in a direction generally normal to the movement of said first slide, a cutting tool carried by said cross-slide for engaging the work, a normally stationary step cam abutment carried by the bed and fixed in relation to the path of movement of said first slide adapted to be indexed longitudinally for successive cutting operations with the steps thereof of a height to determine the depth of cut for each corresponding cut, means to bias said cross-slide against a single step of said step cam to determine the position of cut for said tool, means to index said step cam to present successive step abutments for said cross-slide to set the cutting tool for a predetermined depth of cut for each successive forward feed of said first slide, and automatic means operable upon the back traverse of said first slide to actuate said indexing means.

3. A lathe comprising a headstock having a rotary work spindle, a bed disposed to support a tool slide for movement toward and away from the work carried by said spindle, a slide mounted on said bed for movement toward and away from the work, means to drive said spindle, means to move said slide in forward traverse and feed and in back traverse, a cross-slide carried by said first slide for movement thereon in a direction generally normal to the movement of said first slide, a cutting tool carried by said cross-slide for engaging the work, a normally stationary step cam abutment carried by the bed and fixed in relation to the path of movement of said first slide adapted to be indexed longitudinally for successive cutting operations with the steps thereof of a height to determine the depth of cut for each corresponding cut, means to bias said cross-slide against a single step of said step cam to determine the position of cut for said tool, means to index said step cam to present successive step abutments for said cross-slide to set the cutting tool for a predetermined depth of cut for each successive forward feed of said first slide, and a pawl and ratchet connection between said index means and said first slide to effect actuation of said index means in response to the back traverse of said first slide.

4. In a lathe adapted for repeat cutting operations on a single workpiece, a main tool slide, a support for said slide, a cross-slide mounted on said main slide and carrying a cutting tool, an abutment on said support facing in a direction corresponding to the direction of movement of said cross-slide in moving the tool toward the work, an abutment on said cross-slide facing said first named abutment, means biasing said cross-slide relative to said main slide in a direction effecting engagement of said abutments, and means disposed to move one of said abutments relative to its support in a direction effecting a depth of cut adjustment for said tool for each individual successive cutting operation.

5. The lathe of claim 4 in which one of said abutments constitutes a contour cam along which the other abutment is disposed to ride during forward feeding of said first slide to effect contour cutting operations.

6. The lathe of claim 4 in which said last named means comprises a step cam having steps disposed to be indexed for the successive cutting operations, and an abutment disposed to engage a single step of said cam at a time and to engage successive steps of said cam in selected indexing of the same, said cam and last named abutment serving to support one of said first named abutments against the other.

7. The lathe of claim 4 in which one of said abutments constitutes a contour cam along which the other abutment is disposed to ride during forward feeding of said first slide to effect contour cutting operations, and said last named means comprises a step cam having steps disposed to be indexed for the successive cutting operations, and an abutment disposed to engage a single step of said cam at a time and to engage successive steps of said cam in selected indexing of the same, said cam and last named abutment serving to support one of said first named abutments against the other.

8. In a lathe adapted for repeat cutting operations on a single workpiece, a main tool slide, a support for said slide, a cross-slide mounted on said main slide and carrying a cutting tool, an abutment on said support facing in a direction corresponding to the direction of movement of said cross-slide in moving the tool toward the work, an abutment on said cross-slide facing said first named abutment, means biasing said cross-slide relative to said main slide in a direction effecting engagement of said abutments, means disposed to move one of said abutments relative to its support in a direction effecting a depth of cut adjustment for said tool for each individual successive cutting operation, and means disposed to move one of said abutments relative to its support and to the other abutment to effect a tool relief during back traverse of the main slide.

9. In a lathe adapted for repeat cutting operations on a single workpiece, a main tool slide, a support for said slide, a cross-slide mounted on said main slide and carrying a cutting tool, an abutment on said support facing in a direction corresponding to the direction of movement of said cross-slide in moving the tool toward the work, an abutment on said cross-slide facing said first named abutment, means biasing said cross-slide relative to said main slide in a direction effecting engagement of said abutments, a step cam having steps disposed to be indexed for the successive cutting operations, an abutment disposed to engage a single step of said cam at a time and to engage successive steps of said cam in selected indexing of the same, said cam and last named abutment serving to support one of said first named abutments against the other, and means operable in correlation to the back traverse of said main slide to effect indexing of said step cam and last named abutment to adjust the position of the tool and determine the depth of cut thereof during each succeeding forward feed of the main slide and tool.

10. In a lathe adapted for repeat cutting operations on a single workpiece, a main tool slide adapted to traverse and feed the tool for each cutting operation, a cross-slide mounted upon said main slide and carrying the tool for adjusting its position to determine the depth of cut thereof for each successive cutting operation, indexible abutment means disposed between said cross slide and the main slide support to effect the adjustment of said cross-slide between successive feeding operations and automatically in correlation to the movements of said main slide, and means biasing said cross-slide in a direction effecting engagement between said abutment means.

11. In a lathe adapted for repeat contour cutting operations on a single workpiece, a main tool slide adapted to transverse and feed the tool for successive cutting operations, a cross-slide mounted upon said main slide and carrying the tool therefor, two pairs of superimposed abutments disposed to control the position of said cross-slide relative to said main slide, means biasing said cross-slide relative to said main slide in a direction effecting engagement between the abutments of both pairs of abutments, one abutment of one pair of abutments constituting an indexible step cam with the successive steps thereof of a height determining the corresponding depths of cut for the tool for the successive cutting operations, one abutment of the other pair of abutments constituting a contour cam along which its related abutment rides during forward feed of said main slide, and automatic means to index said indexible abutment relative to its related abutment in correlation to the movement of said main slide to set the tool for a predetermined new depth of cut for each forward feed thereof.

12. In a lathe adapted for repeat contour cutting operations on a single workpiece, a main tool slide adapted to traverse and feed the tool for successive cutting operations, a cross-slide mounted upon said main slide and carrying the tool therefor, two pairs of superimposed abutments disposed to control the position of said cross-slide relative to said main slide, means biasing said cross-slide relative to said main slide in a direction effecting engagement between the abutments of both pairs of abutments, one abutment of one pair of abutments constituting an indexible step cam with the successive steps thereof of a height determining the corresponding depths of cut for the tool for the successive cutting operations, one abutment of the other pair of abutments constituting a contour cam along which its related abutment rides during forward feed of said main slide, automatic means to index said indexible abutment relative to its related abutment in correlation to the movement of said main slide to set the tool for a predetermined new depth of cut for each forward feed thereof, and means to relieve said contour cam abutments during back traverse of said main slide to provide a relief for the tool from the work.

13. In a lathe adapted for repeat cutting operations on a single workpiece, a main tool slide adapted to traverse and feed the tool for each cutting operation, a cross-slide mounted upon said main slide and carrying the tool for adjusting its position to determine the depth of cut thereof for each successive cutting operation, a pair of abutments disposed to control the position of said cross-slide relative to said main slide, means biasing said cross-slide relative to said main slide in a direction effecting engagement of said abutments, one of said abutments constituting an indexible step cam with the successive steps thereof of a height determining the successive depths of cut for the tool in successive cutting operations, and automatic means to index said step cam abutment relative to its related abutment in correlation to the movement of said main slide to set the tool for a predetermined new depth of cut for each forward feed thereof.

14. In a lathe adapted for repeat cutting operations on a single workpiece, a main tool slide adapted to traverse and feed the tool for each cutting operation, a cross-slide mounted upon said main slide and carrying the tool for adjusting its position to determine the depth of cut thereof for each successive cutting operation, a pair of abutments disposed to control the position of said cross-slide relative to said main slide, means biasing said cross-slide relative to said main slide in a direction effecting engagement of said abutments, one of said abutments constituting an indexible step cam with the successive steps thereof of a height determining the successive depths of cut for the tool in successive cutting operations, automatic means to index said steps cam abutment relative to its related abutment in correlation to the movement of said main slide to set the tool for a predetermined new depth of cut for each forward feed thereof, and automatic means to return said step cam to starting position upon completion of the final cutting operation.

15. In a lathe adapted for repeat cutting operations on a single workpiece, a main tool slide adapted to traverse and feed the tool for each cutting operation, a cross-slide mounted upon said main slide and carrying the tool for adjusting its position to determine the depth of cut thereof for each successive cutting operation, a pair of abutments disposed to control the position of said cross-slide relative to said main slide, means biasing said cross-slide relative to said main slide in a direction effecting engagement of said abutments, one of said abutments constituting an indexible step cam with the successive steps thereof of a height determining the successive depths of cut for the tool in successive cutting operations, means to index said step cam abutment relative to its related abutment in correlation to the movement of said main slide to set the tool for a predetermined new depth of cut for each forward feed thereof, an index drum having dogs thereon disposed to determine the successive traverse and feed movements for said main slide, and means to index said drum simultaneously with said step cam abutment.

16. In a lathe adapted for repeat cutting operations on a single workpiece, a main tool slide adapted to traverse and feed the tool for each cutting operation, a cross-slide mounted upon said main slide and carrying the tool for adjusting its position to determine the depth of cut thereof for each successive cutting operation, a pair of abutments disposed to control the position of said cross-slide relative to said main slide, means biasing said cross-slide relative to said main slide in a direction effecting engagement of said abutments, one of said abutments constituting an indexible step cam with the successive steps thereof of a height determining the successive depths of cut for the tool in successive cutting operations, means to index said step cam abutment relative to its related abutment in correlation to the movement of said main slide to set the tool for a predetermined new depth of cut for each forward feed thereof, an index drum having dogs thereon disposed to determine the successive traverse and feed movements for said main slide, means to index said drum simultaneously with said step cam abutment, and means to return said step cam and drum to starting position upon completion of the final cutting operation.

17. In a lathe adapted for repeat cutting operations on a single workpiece, a main tool slide adapted to traverse and feed the tool for each cutting operation, a cross-slide mounted upon said main slide and carrying the tool for adjusting its position to determine the depth of cut thereof for each successive cutting operation, a pair of abutments disposed to control the position of said cross-slide relative to said main slide, means biasing said cross-slide relative to said main slide in a direction effecting engagement of said abutments, one of said abutments constituting a contour cam along which its related abutment rides during forward feed of said main slide, and means to relieve said abutments during back traverse of said main slide to provide a relief for the tool from the work.

18. In a lathe, a main tool slide, a support for said slide, a cross-slide mounted on said main slide and carrying the tool, an abutment on said support facing in a direction of movement of said cross-slide in moving the tool toward the work, an abutment on said cross-slide facing said first named abutment, one of said abutments constituting a contour cam for governing the movement of the tool relative to the work during forward feeding movement of said slide, means to traverse and feed said main slide, and means biasing said cross-slide relative to said main slide in a direction effecting engagement of said abutments whereby said contour cam is followed by the related abutment during feeding of the main slide.

19. In a lathe, a main tool slide, a support for said slide, a cross-slide mounted on said main slide and carrying the tool, an abutment on said support facing in a direction of movement of said cross-slide in moving the tool toward the work, an abutment on said cross-slide facing said first named abutment, one of said abutments constituting a contour cam for governing the movement of the tool relative to the work during forward feeding movement of said main slide, means to traverse and feed said main slide, means biasing said cross-slide relative to said main slide in a direction effecting engagement of said abutments whereby said contour cam is followed by the related abutment during feeding of the main slide, said follower abutment being eccentric to a supporting axis therefor, and means to rotate said follower abutment upon the supporting axis therefor between two positions, one effecting a position of said cross-slide during back traverse of said main slide relieving the tool from the work and the other maintaining the follower section of said abutment in contact with said contour cam during forward feed of said main slide and tool.

20. In a lathe of the class described, a main tool slide adapted to traverse and feed the cutting tool, a support for said slide, a cross-slide mounted on said main slide and carrying the cutting tool, a contour cam carried by said support and disposed adjacent the path of movement of said main slide, a follower abutment on said cross-slide adapted to ride in engagement with said contour cam during forward feed of said main slide to control the contour cutting movement of the tool, means biasing said cross-slide in a direction effecting control engagement of said follower abutment with said contour cam, and a stop abutment between said cross-slide and said main slide to limit the movement of said cross-slide in response to said biasing means upon disengagement of said follower abutment and cam.

21. In a lathe of the class described, a main tool slide adapted to traverse and feed the cutting tool, a support for said slide, a cross-slide mounted on said main slide and carrying the cutting tool, a contour cam carried by said support and disposed adjacent the path of movement of said main slide, a follower abutment on said cross-slide adapted to ride in engagement with said contour cam during forward feed of said main slide to control the contour cutting movement of the tool, means biasing said cross-slide in a direction effecting control engagement of said follower abutment with said contour cam, a stop abutment between said cross-slide and said main slide to limit the movement of said cross-slide in response to said biasing means upon disengagement of said follower abutment and cam, and means to disengage said follower abutment from said cam during back traverse of said main slide to provide relief for said tool from the work.

22. In a lathe of the class described, a main tool slide adapted to traverse and feed the cutting tool, a support for said slide, a cross-slide mounted on said main slide and carrying the cutting tool, a contour cam carried by said support and disposed adjacent the path of movement of said main slide, a follower abutment on said cross-slide adapted to ride in engagement with said contour cam during forward feed of said main slide to control the contour cutting movement of the tool, means biasing said cross-slide in a direction effecting control engagement of said follower abutment with said contour cam, a slide plate on said support and to which said contour cam is secured, said plate being movable in the same direction as said cross-slide, a step cam carried by said support and disposed to be engaged by an abutment on said slide plate in response to said biasing means, and automatic means to index said step cam in relation to said last named abutment to determine the depth of cut for said tool during each successive forward feed of said main slide.

23. In a lathe of the class described, a main tool slide adapted to traverse and feed the cutting tool, a support for said slide, a cross-slide mounted on said main slide and carrying the cutting tool, a contour cam carried by said support and disposed adjacent the path of movement of said main slide, a follower abutment on said cross-slide adapted to ride in engagement with said contour cam during forward feed of said main slide to control the contour cutting movement of the tool, means biasing said cross-slide in a direction effecting control engagement of said follower abutment with said contour cam, a slide plate on said support and to which said contour cam is secured, said plate being movable in the same direction as said cross-slide, a step cam carried by said support and disposed to be engaged by an abutment on said slide plate in response to said biasing means, and a pawl and ratchet connection between said step cam and said main slide whereby said step cam is indexed by each back traverse movement of the main slide to adjust the depth of cut for the tool for the next succeeding forward feed of the main slide.

24. In a lathe of the class described, a main tool slide adapted to traverse and feed the cutting tool, a support for said slide, a cross-slide mounted on said main slide and carrying the cutting tool, a contour cam carried by said support and disposed adjacent the path of movement of said main slide, a follower abutment on said cross slide adapted to ride in engagement with said contour cam during forward feed of said main slide to control the contour cutting movement of the tool, means biasing said cross-slide in a direction effecting control engagement of said follower abutment with said contour cam, a slide plate on said support and to which said contour cam is secured, said plate being movable in the same direction as said cross-slide, a step cam carried by said support and disposed to be engaged by an abutment on said slide plate in response to said biasing means, a pawl and ratchet connection between said step cam and said main slide whereby said step cam is indexed by each back traverse movement of the main slide to adjust the depth of cut for the tool for the next succeeding forward feed of the main slide, and automatic power means operable upon the back traverse of said main slide after the final cut of the tool to recock said step cam to starting position for another cycle.

25. In a lathe of the class described, a normally stationary step cam disposed to determine the depth of cut for the tool in repeat cutting operations, and automatic means to index said step cam to present successive steps thereof in operative position in correlation to repeat cutting operations of the tool whereby each step of the cam determines the depth of cut for a corresponding cutting operation.

26. In a lathe of the class described, a normally stationary step cam disposed to determine the depth of cut for the tool in repeat cutting operations, automatic means to index said step cam to present successive steps thereof in operative position in correlation to repeat cutting operations of the tool whereby each step of the cam determines the depth of cut for a corresponding cutting operation, and means to return the step cam to starting position upon completion of the final cut of a cycle.

27. In a lathe of the class described adapted to employ repeat cutting operations upon a workpiece wherein the cutting tool has to be adjusted for depth of cut for each cutting operation, a step cam having an individual step position for each cutting action to determine the depth of cut for the tool, a control drum having means thereon to determine the automatic traverse and feed of the tool and repeat of cut therefor for each successive cutting operation, and common means to index said step cam and drum between the successive feeding operations for the tool.

28. In a lathe of the class described adapted to employ repeat cutting operations upon a workpiece wherein the cutting tool has to be adjusted for depth of cut for each cutting operation, a step cam having an individual step position for each cutting action to determine the depth of cut for the tool, a control drum having means thereon to determine the automatic traverse and feed of the tool and repeat of cut therefor for each successive cutting operation, and common means connected to said tool whereby back traverse of the tool indexes both said step cam and said drum for the next succeeding forward traverse and feed for the tool.

29. In a lathe of the class described adapted to employ repeat cutting operations upon a workpiece wherein the cutting tool has to be adjusted for depth of cut for each cutting operation, a step cam having an individual step position for each cutting action to determine the depth of cut for the tool, a control drum having means thereon to determine the automatic traverse and feed of the tool and repeat of cut therefor for each successive cutting operation, means connected to said tool whereby back traverse of the tool indexes both said step cam and said drum for the next succeeding forward traverse and feed for the tool, and means actuated in response to a dog on said drum to effect return of said step cam and drum to start position after completion of the final cutting operation of the tool on a workpiece.

30. In a lathe of the class described adapted to employ repeat cutting operations upon a workpiece wherein the cutting tool has to be adjusted for depth of cut for each cutting operation, a step cam having an individual step position for each cutting action to determine the depth of cut for the tool, a control drum having means thereon to determine the automatic traverse and feed of the tool and repeat of cut therefor for each successive cutting operation, means to index said step cam and drum between the successive feeding operations for the tool, and automatic time delay means actuated by said controls on said drum to produce a dwell between the termination of the feeding of the tool and the start of the back traverse therefor whereby the end of the cut is normal to the axis of rotation of the workpiece.

LORENZ A. LEIFER.
CHARLES H. JOHNSON.

REFERENCES CITED

The following references are of record in the file of this patent:

UNITED STATES PATENTS

| Number | Name | Date |
|---|---|---|
| 689,845 | Barrow | Dec. 31, 1901 |
| 2,370,286 | Berger | Feb. 27, 1945 |

FOREIGN PATENTS

| Number | Country | Date |
|---|---|---|
| 580,235 | Great Britain | Aug. 30, 1946 |